(12) United States Patent
Ahn et al.

(10) Patent No.: US 8,632,041 B2
(45) Date of Patent: Jan. 21, 2014

(54) PORTABLE CRADLE

(75) Inventors: Chi-Young Ahn, Seoul (KR); Young-Ju Yeo, Seoul (KR); Chang-Hwan Hwang, Goyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 258 days.

(21) Appl. No.: 12/702,732

(22) Filed: Feb. 9, 2010

(65) Prior Publication Data

US 2010/0200721 A1   Aug. 12, 2010

(30) Foreign Application Priority Data

Feb. 11, 2009   (KR) .................. 10-2009-0010978

(51) Int. Cl.
*A47G 29/00* (2006.01)
*H04M 1/00* (2006.01)

(52) U.S. Cl.
USPC .................. 248/346.04; 248/309.1; 248/918; 379/454; D14/251

(58) Field of Classification Search
USPC ............... 248/309.1, 346.01, 346.03, 346.04, 248/687, 917, 918; 379/446, 449, 454; 455/575.1; D14/217, 251, 253; 224/483; 361/679.55, 679.56
See application file for complete search history.

(56) References Cited

U.S. PATENT DOCUMENTS

| | | | | |
|---|---|---|---|---|
| 3,130,276 | A * | 4/1964 | Coviello | 379/449 |
| 4,998,277 | A * | 3/1991 | Rioux, Jr. | 379/454 |
| 5,060,260 | A * | 10/1991 | O'Connell | 379/454 |
| 5,668,869 | A * | 9/1997 | Zinno | 379/449 |
| 6,491,194 | B2 * | 12/2002 | Marvin | 224/483 |
| 7,099,466 | B2 * | 8/2006 | Walsh | 379/446 |
| D557,259 | S * | 12/2007 | Hirsch | D14/217 |
| 7,487,940 | B2 * | 2/2009 | Saez et al. | 248/176.1 |
| D616,431 | S * | 5/2010 | Hijmans | D14/253 |
| 7,930,006 | B2 * | 4/2011 | Neu et al. | 455/575.1 |
| 8,020,816 | B2 * | 9/2011 | Laitila et al. | 248/125.7 |
| D647,881 | S * | 11/2011 | Warner | D14/217 |
| D658,170 | S * | 4/2012 | Chen et al. | D14/253 |
| 2004/0040994 | A1 * | 3/2004 | Parcelles | 224/483 |
| 2006/0052144 | A1 * | 3/2006 | Seil et al. | 455/575.1 |
| 2006/0129662 | A1 | 6/2006 | Lelcuk | |

FOREIGN PATENT DOCUMENTS

KR   10-2007-0013062   1/2007
KR   1020070084645   8/2007

* cited by examiner

*Primary Examiner* — Tan Le
(74) *Attorney, Agent, or Firm* — H.C. Park & Associates, PLC

(57) ABSTRACT

A cradle for a portable terminal is disclosed. The cradle may include a bottom portion, a first support portion, and a second support portion. The bottom portion may have a frictional surface on top and bottom surfaces thereof. The first support portion may be located at one side end of the bottom portion and may face the bottom portion. The first support portion may have resilience for deformation and can support a portable terminal. The bottom portion, the first support portion, and the second support portion can support the cradled portable terminal.

17 Claims, 2 Drawing Sheets

PORTABLE CRADLE

CROSS REFERENCE TO RELATED APPLICATION

This application claims priority from and the benefit of Korean Patent Application No. 10-2009-0010978, filed on Feb. 11, 2009, which is hereby incorporated by reference for all purposes as if fully set forth herein.

BACKGROUND OF THE INVENTION

1. Field of the Invention

Exemplary embodiments of the present invention relate to a cradle for a portable terminal.

2. Description of the Background

Portable terminals may be used for various purposes including, for example, voice communications, transmitting and receiving text messages, a gaming device, and/or a display device for displaying digital multimedia broadcasting (DMB) content. Portable terminals may include a personal schedule management function, a navigation system, and/or a camera function to obtain photograph images and various moving pictures. For example, a user of a portable terminal may be able to watch various moving pictures using the portable terminal at any time.

A cradle may be used to provide greater convenience when the user watches a movie, a video on demand (VoD), or DMB content (e.g., TV). The cradle may be portable. The portable cradle may be provided separately from the portable terminal to minimize inconvenience when the user watches TV using the portable terminal.

Current portable cradles suffer from various problems. For example, a conventional portable cradle may scratch the outer portion of a portable terminal when the portable terminal is placed in the portable cradle. Conventional portable cradles also have a large number of parts, resulting in high manufacturing costs. Current portable cradles are easily affected by vibrations and impact and may not sufficiently support a portable terminal due to low friction with a surface when the portable terminal is held at an incline on a desk or flat surface.

SUMMARY OF THE INVENTION

Exemplary embodiments of the present invention provide a portable cradle for a portable terminal.

Additional features of the invention will be set forth in the description which follows, and in part will be apparent from the description, or may be learned by practice of the invention.

Exemplary embodiments of the present invention disclose a cradle for a portable terminal including a bottom portion and a first support portion. The bottom portion includes a top surface and a bottom surface. The top surface and the bottom surface are frictional surfaces. The first support portion is situated at one end of the bottom portion and extends in a direction in which the first support portion faces the bottom portion. The first support portion is at least partially bent, and has a resiliency for deformation.

Exemplary embodiments of the present invention disclose an apparatus including a bottom portion, a first support portion, and a second support portion. The bottom portion has a first region and a second region situated opposite to the first region. The first region is separated from the second region by an inclined surface. The first support portion is connected to the first region and is parallel, at least in part, to the first region. The second support portion is connected to the second region and is parallel, at least in part, to the second region. The first support portion and the second support portion have a resilience for deformation and have frictional surfaces.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
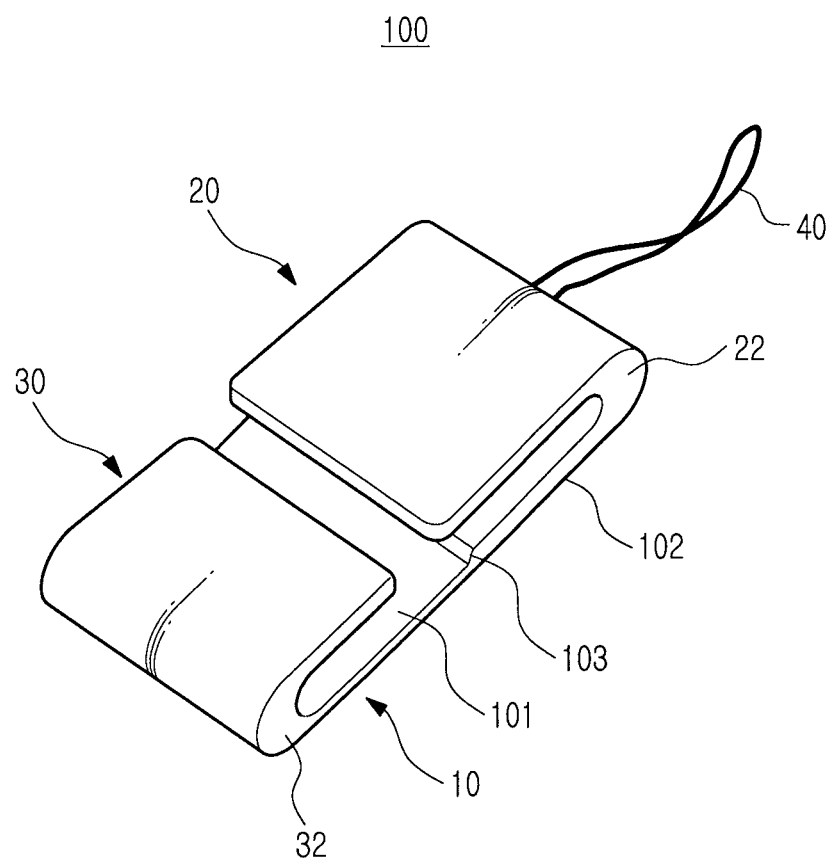
FIG. 1 is a perspective view illustrating a portable cradle according to exemplary embodiments of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Hereinafter, exemplary embodiments of the present invention will be described with reference to the accompanying drawings.

Figure 2:
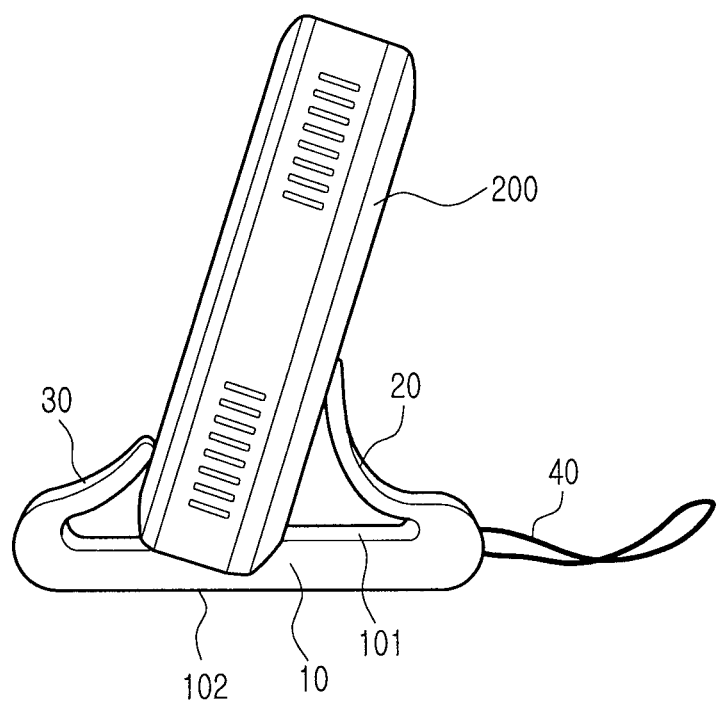
FIG. 2 is a side view illustrating a portable terminal cradled on the portable cradle at an inclined angle, according to exemplary embodiments of the present invention.

FIG. 1 is a perspective view illustrating a portable cradle 100 according to exemplary embodiments of the present invention. FIG. 2 is a side view illustrating a portable terminal 200 cradled on the portable cradle 100 at an inclined angle, according to exemplary embodiments of the present invention. As illustrated in FIG. 1 and FIG. 2, the portable cradle 100 may be a portable device that may be used to hold the portable terminal 200 at an inclined angle (e.g., 20°, 30°, 45°, 60°, 80°, and 90°) on a foundation (e.g., desk or flat surface). In some cases, the inclined angle may be greater than 0° and less than 90° relative to the foundation, and in some cases, the inclined angle may be greater than 0° and less than 180° relative to the foundation. The portable cradle 100 may include a bottom portion 10, and a first support portion 20 bent at one side end 22 of the bottom portion 10 so as to extend in a direction parallel to the bottom portion 10. The bottom portion 10 may include a top surface 101 and a bottom surface 102. The top surface 101 and the bottom surface 102 may have frictional surfaces and may be made of a resilient material having a frictional force. The first support portion 20 may be deformed, and may support the cradled portable terminal 200 together with the frictional surface of the top surface 101 of the bottom portion 10. The frictional surface of the bottom surface 102 may prevent the cradle 100 from moving easily (e.g., slipping) if the cradle 100 experiences an impact or vibration.

The portable cradle 100 may also include a second support portion 30 bent at an opposite end 32 of the bottom portion 10 extending towards the first support portion 20, and also being parallel to the bottom portion 10. The second support portion 30 may be deformed and may support the cradled portable terminal 200 together with the bottom portion 10 and the first support portion 20.

The first support portion 20 and the second support portion 30 may face each other and the bottom portion 10. The first support portion 20 and the second support portion 30 may be spaced apart from the bottom portion 10 to form spaces with the bottom portion 10, and may also be spaced apart from each other.

The extended lengths of the first support portion 20 and the second support portion 30 may be different. For example, the first support portion 20 may have an extended length that is longer than the extended length of the second support portion 30. As illustrated in FIG. 2, the first support portion 20 may support the rear surface of the cradled portable terminal 200, and the second support portion 30 may support the front surface of the cradled portable terminal 200. When the portable terminal 200 is cradled at an inclined angle, the first support portion 20 may support the portable terminal 200 with its own resiliency while being deformed, and the second support portion 30 may support the portable terminal 200 with its own resiliency while being deformed. When the portable terminal 200 is cradled at a larger inclined angle, a resilient force of the first support portion 20 may be larger than a resilient force of the second support portion 30.

A user may adjust the inclined angle of the cradled portable terminal 200 simply by adjusting the cradled position of the portable terminal 200 when the portable terminal 200 is placed on the bottom portion 10.

The bottom portion 10, the first support portion 20, and the second support portion 30 of the portable cradle 100 may be integrally formed, and may be made of the same material, such as, for example, a silicon rubber material. The silicon rubber material can be manufactured at a low cost and can be realized in various colors, so that the portable cradle 100 can be utilized as an accessory while being carried together with the portable terminal 200.

The portable cradle 100 may have a connecting strap 40 for carrying the portable cradle 100 together with the portable terminal 200.

The bottom portion 10, the first support portion 20, and the second support portion 30 may be flattened, and the bottom portion 10 may be thicker than the first support portion 20 and the second support portion 30. This is partly because the center of gravity of the portable cradle 100 may need to be within the bottom portion 10, and partly because the first support portion 20 and the second support portion 30 need to support the front and rear sides of the portable terminal 200 when they are deformed.

As illustrated in FIG. 1, the bottom portion 10 may have an inclined surface 103. A region of the bottom portion 10 facing the first support portion 20 may be thicker than a region of the bottom portion 10 facing the second support portion 30, and both regions may be defined with respect to the inclined surface 103 of the bottom portion 10. For example, the region facing the first support portion 20 may be separated from the region facing the second support portion 30 by the inclined surface 103. The inclined surface 103 is advantageous in providing the cradled position of the portable terminal 200.

As illustrated in FIG. 2, if the portable terminal 200 is cradled on the portable cradle 100, the user can conveniently watch a movie, a VoD, or TV, through the display of the portable terminal 200. Moreover, when the cradled angle of the portable terminal 200 is unsatisfactory, the cradled angle of the portable terminal 200 can be adjusted to a desired angle by the user, as noted above.

Accordingly, a portable cradle according to exemplary embodiments of the present invention can prevent a portable terminal carried with the portable cradle from being scratched, and has a simple structure thereby reducing manufacturing costs of the portable cradle. Further, the portable cradle can minimize damage to a portable terminal due to vibration or impact due to the frictional surfaces when the portable terminal is held on a foundation. The cradled angle of the portable cradle can be adjusted by a very simple operation.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A cradle for a portable terminal, the cradle comprising:
a bottom portion comprising a top surface and a bottom surface opposite the top surface, the top surface and the bottom surface being frictional surfaces, the frictional bottom surface being configured to prevent the cradle from slipping, the frictional top surface being configured to prevent the portable terminal from slipping;
a first support portion situated at a first end of the bottom portion, the first support portion facing the bottom portion, the first support portion being bent, at least partially, and having a resilience for deformation; and
a second support portion situated at a second end of the bottom portion, the second end being situated at an opposite end relative to the first end,
wherein the first support portion and the second support portion are spaced apart from the bottom portion at the same height when the first support portion and the second support portion are not deformed, and, in response to being deformed, the first support position is spaced apart from the bottom portion at a greater height than the second support position is spaced apart from the bottom portion,
wherein the second support portion faces the bottom portion and extends towards the first support portion, the second support portion being bent, at least partially, and having a resilience for deformation, wherein the first support portion, the second support portion, and the frictional surfaces of the bottom portion are configured to support the portable terminal, and
wherein the bottom portion, the first support portion, and the second support portion comprise a silicon rubber material.

2. The cradle of claim 1, wherein an extended length of the first support portion is different than an extended length of the second support portion.

3. The cradle of claim 1, wherein the first support portion and the second support portion are parallel, at least in part, to the bottom portion.

4. The cradle of claim 1, wherein the first support portion is spaced apart from the second support portion.

5. The cradle of claim 1, wherein the bottom portion, the first support portion, and the second support portion are integrally formed.

6. A cradle for a portable terminal, the cradle comprising:
a bottom portion comprising a top surface and a bottom surface, the top surface and the bottom surface being frictional surfaces, the frictional bottom surface being configured to prevent the cradle from slipping;

a first support portion situated at a first end of the bottom portion, the first support portion facing the bottom portion, the first support portion being bent, at least partially, and having a resilience for deformation; and a second support portion situated at a second end of the bottom portion, the second end being situated at an opposite end relative to the first end, the second support portion facing the bottom portion and extending towards the first support portion, the second support portion being bent, at least partially, and having a resilience for deformation, wherein the first support portion, the second support portion, and the frictional surfaces of the bottom portion are configured to support the portable terminal, wherein the bottom portion has an inclined surface on the top surface, and a region of the bottom portion facing the first support portion is thicker than a region of the bottom portion facing the second support portion, the region facing the first support portion being separated from the region facing the second support portion by the inclined surface.

7. The cradle of claim 1, wherein the bottom portion, the first support portion, and the second support portion are configured to support the portable terminal at an inclined angle.

8. The cradle of claim 7, wherein the inclined angle is greater than 0° and less than 90°.

9. The cradle of claim 2, wherein a region of the bottom portion facing the first support portion is thicker than a region of the bottom portion facing the second support portion, and wherein the extended length of the first support portion is longer than the extended length of the second support portion.

10. An apparatus, comprising:

a bottom portion having a first region and a second region situated opposite to the first region, the first region being separated from the second region by an inclined surface;

a first support portion connected to the first region and parallel, at least in part, to the first region; and a second support portion connected to the second region and parallel, at least in part, to the second region, wherein the first support portion and the second support portion have a resilience for deformation, wherein a bottom surface of the bottom portion comprises a frictional surface configured to prevent the apparatus from slipping, and a top surface of the bottom portion opposite the bottom surface comprises a frictional surface, and wherein the first support portion and the second support portion are spaced apart from the bottom portion at the same height when the first support portion and the second support portion are not deformed, and, in response to being deformed, the first support position is spaced apart from the bottom portion at a greater height than the second support position is spaced apart from the bottom portion.

11. The apparatus of claim 10, wherein the first region is thicker than the second region.

12. The apparatus of claim 10, wherein the first support portion has a first extended length and the second support portion has a second extended length, the first extended length being greater than the second extended length, and wherein the second support portion extends, at least partially, towards the first support portion.

13. The apparatus of claim 10, wherein the bottom portion, the first support portion, and the second support portion comprise a silicon rubber material.

14. The apparatus of claim 10, wherein the first support portion and the second support portion are configured to be adjusted in response to placing and supporting a portable terminal in the apparatus.

15. The apparatus of claim 14, wherein the inclined surface, the first support portion, and the second support portion support the portable terminal, and wherein the portable terminal directly contacts the inclined surface.

16. The apparatus of claim 14, wherein the first support portion and the second support portion are bent, at least partially, to support the portable terminal.

17. The apparatus of claim 14, wherein the portable terminal is supported at an inclined angle, the inclined angle being greater than 0° and less than 90°.

* * * * *